(12) United States Patent
Matsumura

(10) Patent No.: US 11,487,428 B2
(45) Date of Patent: Nov. 1, 2022

(54) STORAGE CONTROL APPARATUS AND STORAGE CONTROL METHOD

(71) Applicant: FUJITSU LIMITED, Kawasaki (JP)

(72) Inventor: Shinichiro Matsumura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/103,997

(22) Filed: Nov. 25, 2020

(65) Prior Publication Data

US 2021/0223957 A1 Jul. 22, 2021

(30) Foreign Application Priority Data

Jan. 20, 2020 (JP) .............................. JP2020-006794

(51) Int. Cl.
*G06F 12/00* (2006.01)
*G06F 3/06* (2006.01)

(52) U.S. Cl.
CPC .......... *G06F 3/0604* (2013.01); *G06F 3/0619* (2013.01); *G06F 3/0629* (2013.01); *G06F 3/0659* (2013.01); *G06F 3/0683* (2013.01)

(58) Field of Classification Search
CPC .... G06F 3/0604; G06F 3/0619; G06F 3/0683; G06F 3/0629; G06F 3/0659; G06F 11/08; G06F 3/0608; G06F 3/0641
USPC ........................................................ 711/154
See application file for complete search history.

(56) References Cited

U.S. PATENT DOCUMENTS

| | | |
|---|---|---|
| 5,214,781 A | 5/1993 | Miki et al. |
| 11,301,420 B2 * | 4/2022 | Vijayan ............... G06F 11/1464 |
| 2006/0179082 A1 | 8/2006 | Boyd et al. |
| 2010/0332453 A1* | 12/2010 | Prahlad ............... G06F 11/1448 |
| | | 707/E17.007 |
| 2018/0285204 A1* | 10/2018 | Dwarampudi ...... G06F 11/3034 |

FOREIGN PATENT DOCUMENTS

| | | |
|---|---|---|
| JP | H02-33621 A1 | 2/1990 |
| JP | 2006-221628 A | 8/2006 |

* cited by examiner

*Primary Examiner* — Mardochee Chery
(74) *Attorney, Agent, or Firm* — Fujitsu Patent Center

(57) ABSTRACT

A storage control apparatus, includes a memory; and a processor coupled to the memory and configured to: receive management information for managing data stored in a first storage device, generate, for each processing unit of the data, restoration information for restoring the management information, add the data to the restoration information by processing the data based on the management information on a second storage device, store, in the first storage device, the added restoration information, and reconstruct the management information on the second storage device based on the added restoration information when detecting an abnormality occurrence on the receiving the management information.

8 Claims, 14 Drawing Sheets

| LBA | CONTAINER NUMBER | SLOT NUMBER | SumCRC |
|---|---|---|---|
| 00 | 100 | 1000 | AAAA |
| 10 | 0 | 0 | 0 |
| 20 | 500 | 100 | CCCC |

FIG. 6

| VOLUME NUMBER | BLOCK MAP INFORMATION HEAD ADDRESS OVER DISK |
|---|---|
| 1 | 0x1B000000 |
| 2 | 0x09000000 |
| 3 | 0x12000000 |
| 4 | 0x00000000 |
| 5 | 0x24000000 |

| CHUNK #1 | 150 |
|---|---|
| VOLUME NUMBER | 4 |
| VOLUME LBA | 0x00000000 |
| NEXT CHUNK NUMBER | 2 |
| DATA TYPE | BLOCK MAP INFORMATION |

FIG. 11

| CHUNK #8 | ,154 |
|---|---|
| VOLUME NUMBER | 0 (UNUSED) |
| VOLUME LBA | 0 (UNUSED) |
| NEXT CHUNK NUMBER | INVALID |
| DATA TYPE | CONTAINER METADATA INFORMATION |

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2020-6794, filed on Jan. 20, 2020, the entire contents of which are incorporated herein by reference.

FIELD

The embodiment discussed herein is related to a storage apparatus and a storage control method.

BACKGROUND

In a storage system, there is a de-duplication technique for compressing an amount of data to be stored. A de-duplication function will be briefly described. When new data is written over a logical volume, a storage apparatus determines whether or not the same data as the data is already stored in an address area over a physical volume thereof. When the same data is already stored, the storage apparatus performs processing of associating the data with the already stored data without newly writing the data in another address area over the physical volume. Accordingly, the storage apparatus is able to associate the data stored in the physical volume with a plurality of pieces of data over the logical volume, and compress an amount of data to be stored in the storage apparatus.

When a free space of the storage apparatus is small, the storage apparatus executes processing called a garbage collection that removes unnecessary data from the stored data to increase a free space. The storage apparatus executes the following processing as the garbage collection. For example, the storage apparatus periodically monitors a free space, and when the free space becomes equal to or less than a predetermined value, the storage apparatus selects removable data from the stored data. The storage apparatus secures a free space by removing the selected data.

A storage apparatus having such a data de-duplication function has management information for accessing data stored over a disk over a memory. The management information includes volume information and space information. The volume information is address information representing a position of block map information stored over a disk for each volume. The space information is coupling destination information for each chunk which is a handling unit of data.

When power is turned off and a system is stopped, the storage apparatus saves management information over a memory to a bootup and utility device (BUD) which is a storage unit for saving data. The BUD is a disk for backing up cache data over a memory. At the time of system start-up, the storage apparatus may access data stored over a disk by loading the data from the BUD over the memory.

There is a technique in which data is stored in a first physical storage device, data and metadata are stored in a second physical storage device, and data is recovered by using information stored in the second physical storage device when a failure occurs in the first physical storage device. There is a technique of recording data, management information, and update history information in the same management medium and restoring the latest management information using the update history information. For example, Japanese Laid-open Patent Publication Nos. 2006-221628, 02-33621, and the like are disclosed as the related art.

SUMMARY

According to an aspect of the embodiments, a storage apparatus, includes a memory; and a processor coupled to the memory and configured to: receive management information for managing data stored in a first storage device, generate, for each processing unit of the data, restoration information for restoring the management information, add the data to the restoration information by processing the data based on the management information on a second storage device, store, in the first storage device, the added restoration information, and reconstruct the management information on the second storage device based on the added restoration information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of block map information;

FIG. 6 is a diagram illustrating an example of volume information;

FIG. 9 is a diagram illustrating an example of data restoration information;

FIG. 11 is a diagram illustrating an example of data restoration information of container metadata information;

DESCRIPTION OF EMBODIMENTS

However, in a case where a power failure occurs due to a lightning strike or the like and the storage apparatus is powered off, when hardware such as a memory breaks down, management information is lost. For example, when a controller goes down before the management information over a memory is stored in a BUD of the controller of the storage apparatus, the management information is lost without being stored. In a case of a redundant configuration in which two BUDs are provided in a controller of a storage apparatus, when both the two BUDs break down, it becomes difficult to acquire management information at the time of start-up. In this case as well, the state is the same as when the management information is lost. When the management information is lost in this way, data stored over a disk may not be accessed, and it also becomes difficult to operate a de-duplication function.

In view of the above, it is desirable to provide a storage apparatus and a storage control method that improve reliability.

Hereinafter, an embodiment of a storage apparatus disclosed in the present application will be described in detail with reference to the drawings. The storage apparatus disclosed in the present application is not limited to the following embodiment.

Embodiment

Figure 1:
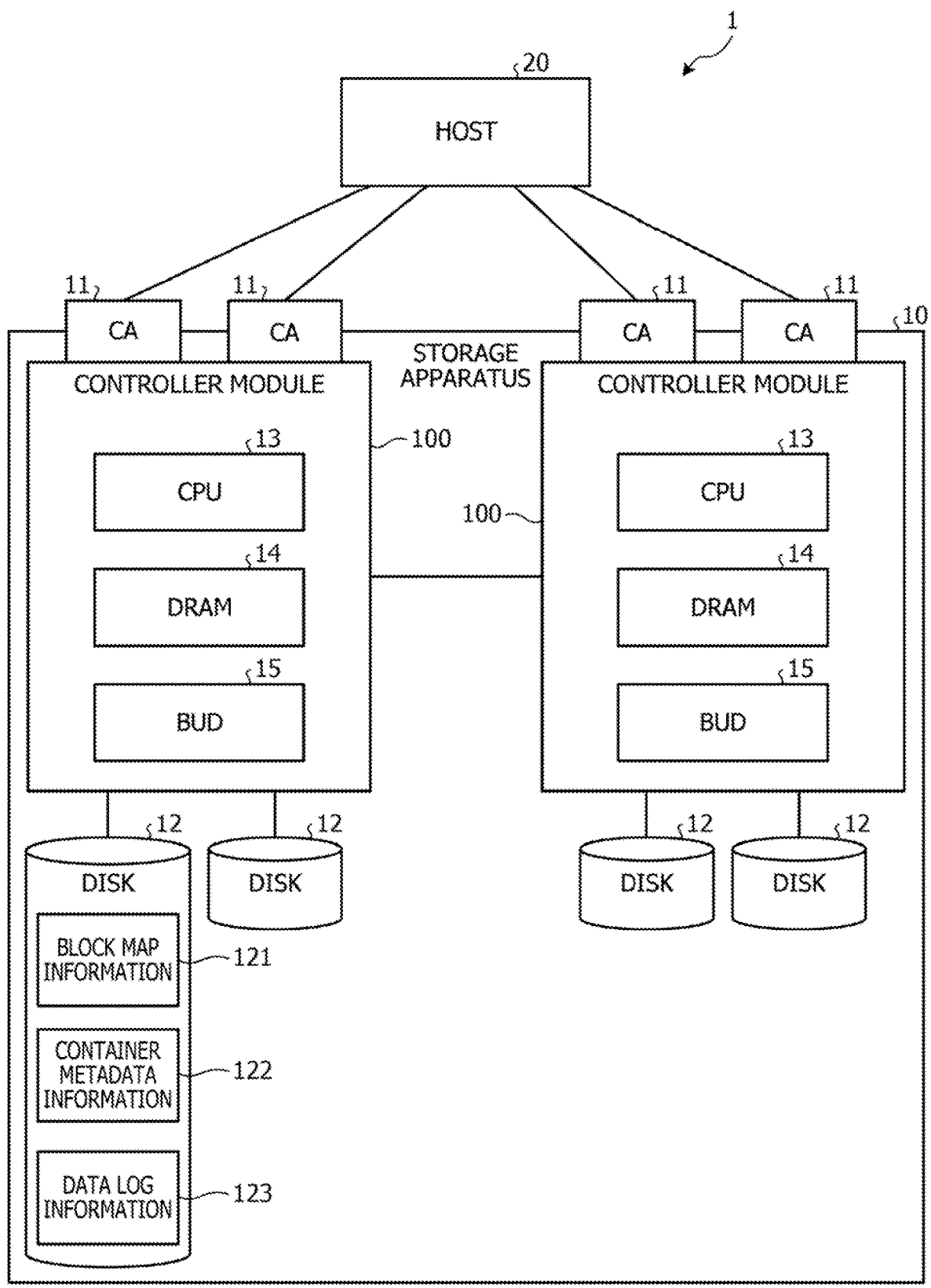
FIG. 1 is a diagram illustrating hardware of a storage system according to an embodiment.

FIG. 1 is a diagram illustrating hardware of a storage system according to an embodiment. A storage system 1 according to the present embodiment has a storage apparatus 10 and a host 20 coupled to the storage apparatus 10.

The host 20 is an operation processing device. The host 20 executes an operation by using data stored in the storage apparatus 10 and stores an operation result and the like in the storage apparatus 10. For example, the host 20 transmits a write command to the storage apparatus 10 and stores data in the storage apparatus 10. The host 20 transmits a read command to the storage apparatus 10 and acquires data designated by the read command from the storage apparatus 10.

The storage apparatus 10 has a channel adapter (CA) 11, a disk 12, and a controller module (CM) 100.

The CA 11 is a communication interface for controlling communication between the host 20 and the controller module 100. One or a plurality of CAs 11 are arranged. The controller module 100, which is a target for controlling communication, is allocated to each CA 11.

The controller module 100 has a central processing unit (CPU) 13, a dynamic random-access memory (DRAM) 14, and a bootup and utility device (BUD) 15. The controller module 100 performs resource management of the CA 11, the disk 12, the CPU 13, the DRAM 14, and the BUD 15.

The CPU 13 executes various kinds of processing executed by the controller module 100. The DRAM 14 is a cache memory used as a primary cache and stores user data and control information.

For the BUD 15, for example, a solid-state drive (SSD) or the like is used. The BUD 15 is a storage device for backing up cache data stored in the DRAM 14.

The disk 12 is a nonvolatile auxiliary storage device that stores user data, control information, and the like. For example, the disk 12 stores block map information 121, container metadata information 122, and data log information 123. The disk 12 corresponds to an example of a "storage unit".

The block map information 121 is a table indicating a storage position of data for each 8 KB. FIG. 2 is a diagram illustrating an example of block map information. As illustrated in FIG. 2, the block map information 121 has a logical block address (LBA), a container number (ID: identifier), a slot number, and a value of cyclic redundancy check (CRC) registered therein. From the container number and the slot number registered in the block map information 121, the storage position of data indicated by a specific LBA is specified. One container is divided into 2M slots. Since 8 KB of data is managed in each slot, a size of the container is 16 GB.

Figure 3:
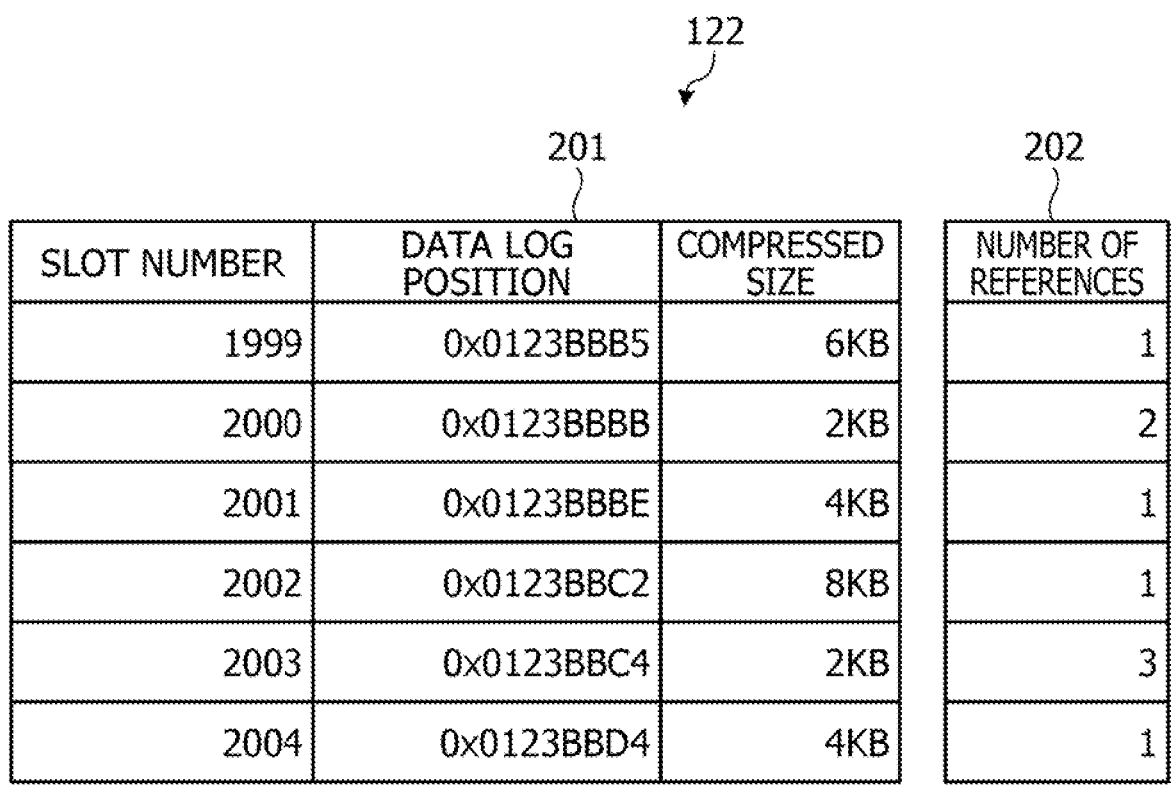
FIG. 3 is a diagram illustrating an example of container metadata information.

The container metadata information 122 is a table indicating position information of the data log information 123 of data corresponding to each slot of the container. FIG. 3 is a diagram illustrating an example of container metadata information. In the present embodiment, as illustrated in FIG. 3, the container metadata information 122 includes slot information 201 and a reference list 202.

In the slot information 201, a data log position indicating a position of the data log information 123 is registered in association with a slot number. For example, in the slot information 201, an address representing a position of a disk where compressed data of each of the 2M slots is stored is registered. A position of the data log of the data corresponding to the slot number may be specified by the slot information 201. The reference list 202 has a counter representing the number of references for each slot. When the de-duplication is performed and the same data is referred to from two locations, the counter of the reference list 202 corresponding to the slot storing the data becomes two. When the counter of the reference list 202 is 0, it means that the data is not referred to, and it is unused data which may be deleted.

Figure 4:
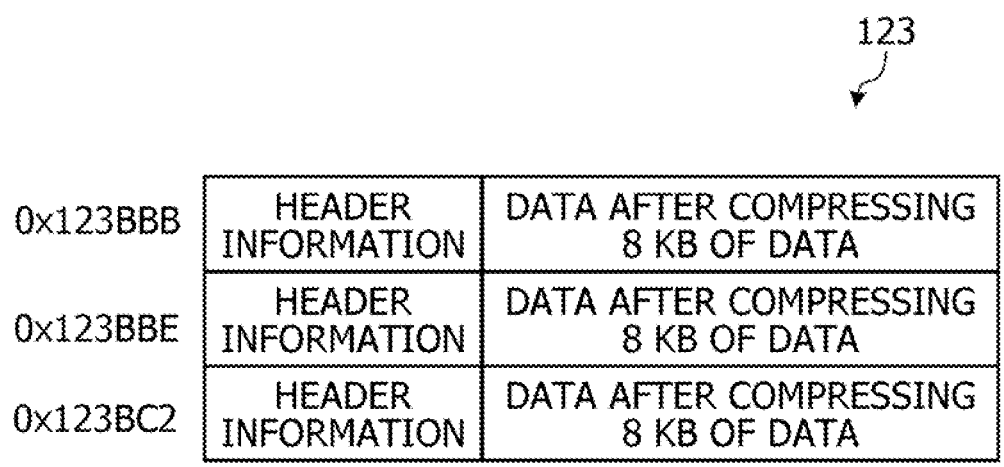
FIG. 4 is a diagram illustrating an example of data log information.

FIG. 4 is a diagram illustrating an example of data log information. As illustrated in FIG. 4, in the data log information 123, compressed data after compressing 8 KB of data and management information of the compressed data are stored. Since the size after compression is different for each 8 KB, access to the compressed data in the data log information 123 is performed by using a start position of the data obtained from the slot information 201.

Figure 5:
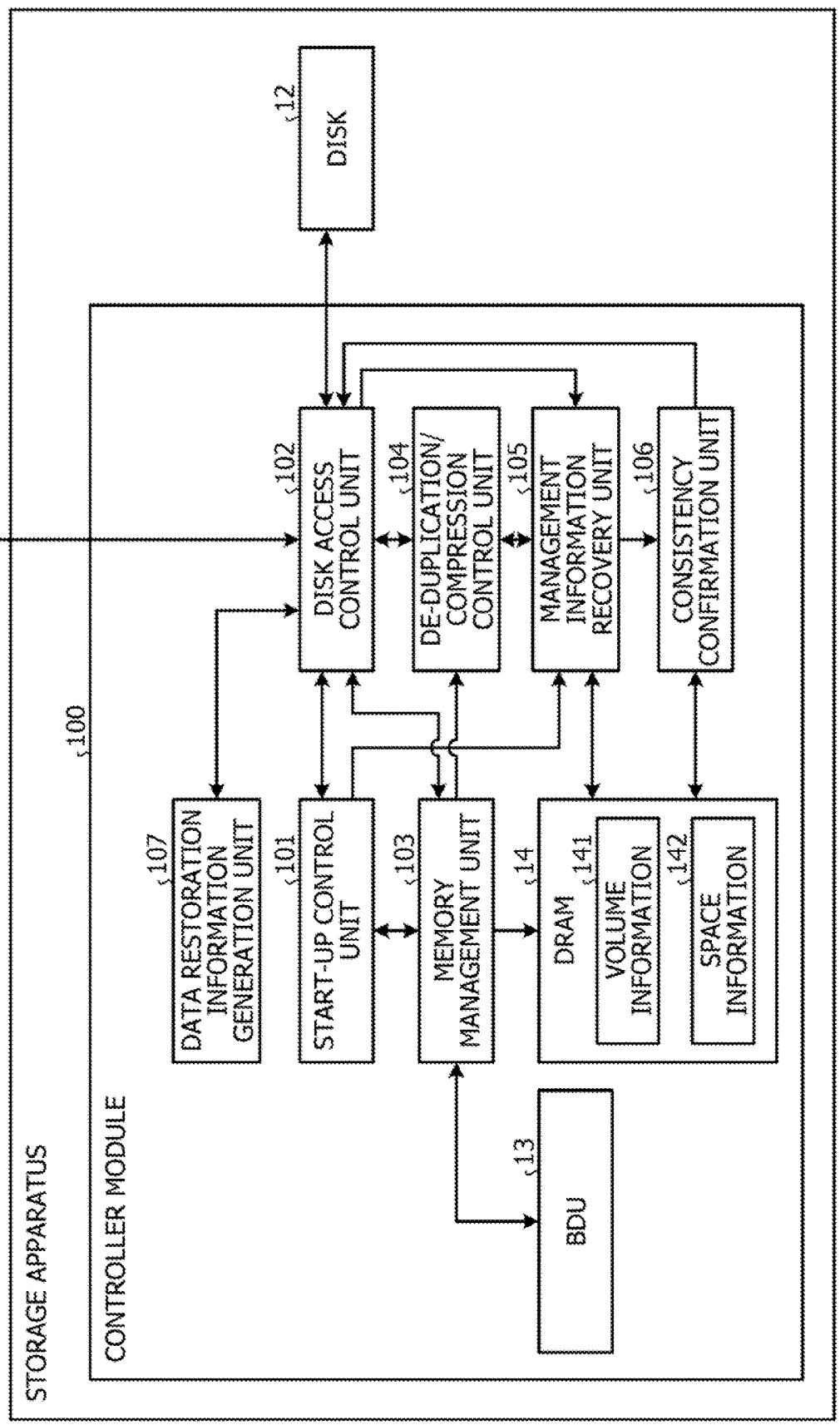
FIG. 5 is a block diagram of a controller module.

Next, the controller module 100 will be described with reference to FIG. 5. FIG. 5 is a block diagram of a controller module. As illustrated in FIG. 5, the controller module 100 has a start-up control unit 101, a disk access control unit 102, a memory management unit 103, a de-duplication/compression control unit 104, a management information recovery unit 105, and a consistency confirmation unit 106. Each of these units is realized by the CPU 13 illustrated in FIG. 1 executing a program.

The DRAM 14 is a volatile main storage device. The DRAM 14 has volume information 141 and space information 142. The DRAM 14 corresponds to an example of a "temporary storage unit". The volume information 141 and the space information 142 are information used in a case of accessing data stored in the disk 12 as will be described later, and in the following, the volume information 141 and the space information 142 may be collectively referred to as management information.

FIG. 6 is a diagram illustrating an example of volume information. As illustrated in FIG. 6, in the volume information 141, a head address of the block map information 121 over the disk 12 of the volume is registered in association with a volume number.

Figure 7:
FIG. 7 is a diagram illustrating an example of space information.

FIG. 7 is a diagram illustrating an example of space information. In the space information 142, a chunk number of a next chunk is registered in association with a chunk number. A chunk refers to a storage area which is sequentially allocated with respect to a write request, and corresponds to a processing unit of data. In the last chunk corresponding to the write request, information indicating that it is the last chunk indicated as "INVALID" in FIG. 7 is registered. For example, when data stored in the chunk are joined in an order described in the space information 142, a series of data designated by one write request is obtained. A chunk is formed by gathering one or a plurality of logical volumes. For example, when one logical volume is 21 MB, the chunk has a size of 21 MB or more.

The start-up control unit 101 starts start-up processing of the storage apparatus 10 when a start-up condition is satisfied, for example, when the power is turned on or when an instruction is received from the host 20. The start-up control unit 101 instructs the memory management unit 103 to acquire management information in the start-up processing. Thereafter, when receiving a notification of normal reading of the management information from the memory management unit 103, the start-up control unit 101 performs normal start-up processing to complete normal start-up of the storage apparatus 10.

On the other hand, when receiving a notification of an abnormality occurrence in the reading of the management information from the memory management unit 103, the start-up control unit 101 outputs an instruction to shift to a recovery mode to the disk access control unit 102. Thereafter, the start-up control unit 101 instructs the disk access control unit 102 to read data. The start-up control unit 101 outputs an instruction to execute recovery of the management information to the management information recovery unit 105.

After the recovery and the consistency check of the management information are completed and the garbage collection is executed, the start-up control unit 101 receives a notification of release of the recovery mode from the disk access control unit 102. The start-up control unit 101 requests the memory management unit 103 to determine whether or not the BUD 15 is normal. When the BUD 15 is normal, the start-up control unit 101 restarts the storage apparatus 10. On the other hand, when there is an abnormality in the BUD 15, the start-up control unit 101 notifies an administrator of the storage apparatus 10 of the abnormality occurrence by, for example, displaying an alarm on a display device (not illustrated).

Figure 8:
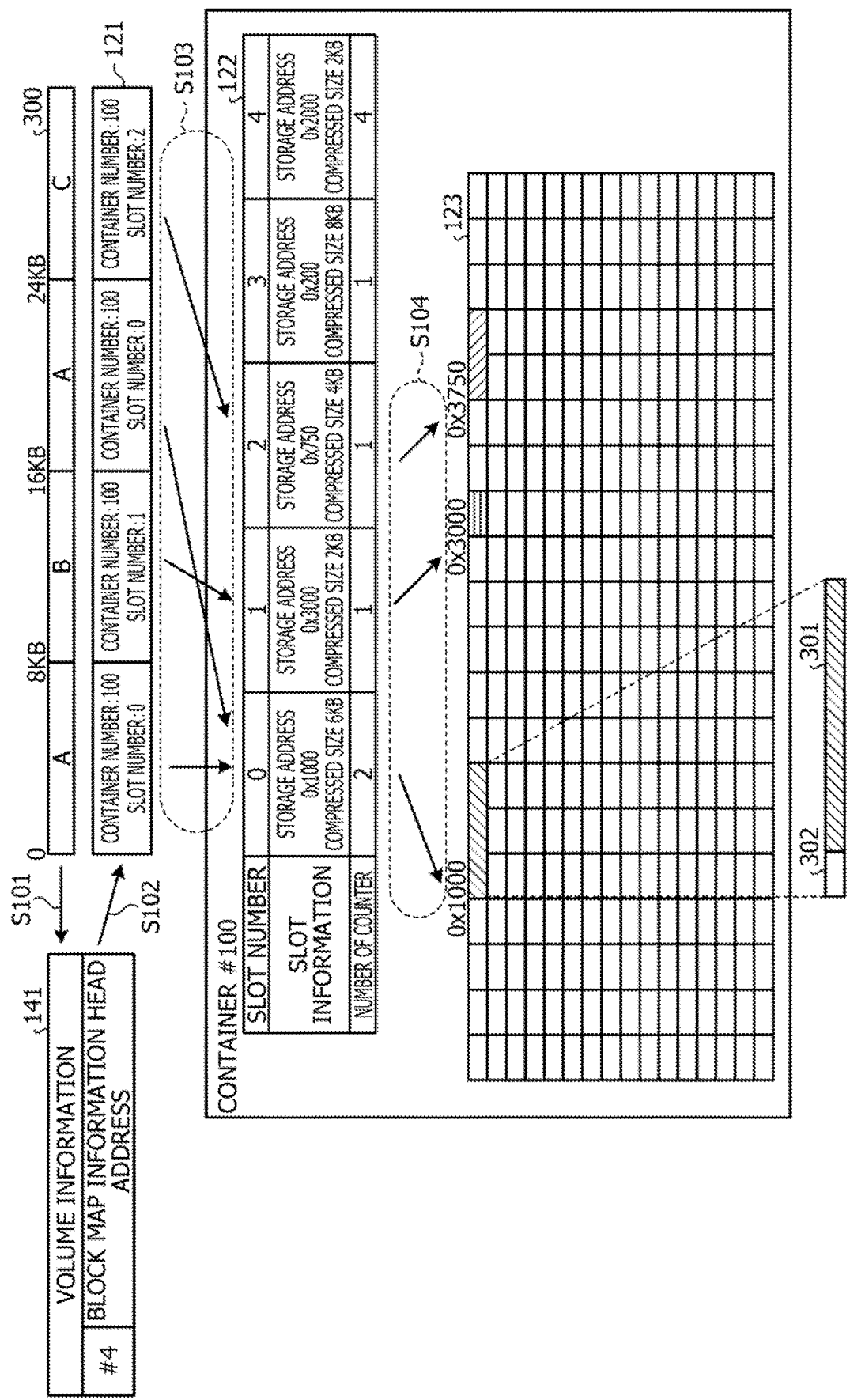
FIG. 8 is a diagram illustrating an image of specific processing in data processing.

The disk access control unit 102 performs reading of data in the following procedure. FIG. 8 is a diagram illustrating an image of specific processing in data processing. The data reading will be described with reference to FIG. 8. The disk access control unit 102 receives an input of a read command 300 from the host 20. The disk access control unit 102 acquires a volume number, an access address, and a block length of a storage destination of data for each 8 KB to be read which is designated by the acquired read command. The disk access control unit 102 obtains an access range from the volume number, the access address, and the block length within 8 KB boundary. In FIG. 8, the disk access control unit 102 specifies a volume having a volume number #4 as the access range based on the volume number, the access address, and the block length. Then, the disk access control unit 102 acquires data from the obtained access range.

The data acquisition processing will be described in more detail. The disk access control unit 102 refers to the volume information 141 stored in the DRAM 14 via the memory management unit 103, and acquires a block map information head address over the disk 12 corresponding to the volume number obtained as the access range (step S101). The disk access control unit 102 reads information from a position designated by the acquired block map information head address in the block map information 121, and acquires a container number and a slot number to be accessed (step S102). The block map information 121 uses an area of 21 MB to which a chunk number is allocated in the logical layer, and an area of 21 MB of a physical layer corresponding to the same chunk number corresponds to the area, and a correspondence relationship thereof is indicated by the space information 142 over the DRAM 14.

Next, the disk access control unit 102 acquires an address of the container over the disk 12 from the acquired container number, and acquires container metadata information 122 of the container from the disk 12 by using the address (step S103). The container metadata information 122 uses an area of 21 MB to which a chunk number is allocated in the logical layer, and an area of 21 MB of the physical layer corresponding to the same chunk number corresponds to the area, and a correspondence relationship thereof is indicated by the space information 142 over the DRAM 14.

Next, the disk access control unit 102 acquires a data log position and a compressed size corresponding to the slot number from the acquired container metadata information 122. Next, the disk access control unit 102 refers to the space information 142 to sequentially acquire chunk numbers, and acquires compressed data from the area of the data log information 123 of the disk 12 by using the data log position and the compressed size (step S104). In the area of the data log information 123 of FIG. 8, data log header information 302 as auxiliary information is actually added in front of compressed data 301. In the data log header information 302, an actual compression size, a hash value, and the like are stored, for example. The data log information 123 uses an area of 21 MB to which a chunk number is allocated in the logical layer, and an area of 21 MB of the physical layer corresponding the same chunk number corresponds to the area, and a correspondence relationship thereof is indicated by the space information 142 over the DRAM 14. By sequentially tracing the chunk numbers indicated by the space information 142, areas to be used in series are confirmed.

After acquiring the compressed data in this way, the disk access control unit 102 decompresses the compressed data and acquires original data. The disk access control unit 102 transmits the acquired data to the host 20 and returns a response with respect to the read command.

The disk access control unit 102 performs writing of data in the following procedure. The disk access control unit 102 receives an input of a write command such as a data update from the host 20. The disk access control unit 102 acquires the volume number, the access address, and the block length of the storage destination of the data to be updated designated by the acquired write command. The disk access control unit 102 obtains an access range from the acquired volume number, the access address, and the block length within 8 KB boundary.

For example, in a case of the data update, the disk access control unit 102 refers to the volume information 141 stored in the DRAM 14 via the memory management unit 103, and acquires the block map information head address over the disk 12 corresponding to the volume number. The disk access control unit 102 reads information from a position designated by the acquired block map information head address in the block map information 121, and acquires a container number and a slot number to be accessed.

Next, the disk access control unit 102 outputs data to be written to the de-duplication/compression control unit 104 and requests determination of the de-duplication of the data to be written. When the data to be written overlaps existing data, the disk access control unit 102 receives a notification of completion of writing by the de-duplication from the de-duplication/compression control unit 104. The disk access control unit 102 returns a write completion response to the host 20.

On the other hand, when the data to be written does not overlap the existing data, the disk access control unit 102 receives an input of the compressed data from the de-duplication/compression control unit 104 together with a notification of a result of non-duplication. The disk access control unit 102 searches for an unused slot in the disk 12 and determines a storage position. At this time, the disk access control unit 102 creates a new slot number.

The disk access control unit 102 requests a data restoration information generation unit 107 to generate data restoration information 150 illustrated in FIG. 9 for each chunk. FIG. 9 is a diagram illustrating an example of data restoration information. In the data restoration information 150, as illustrated in FIG. 9, a volume number in which the chunk is stored, an LBA of the volume, a next chunk number, and a data type are written. The data type is any one of the block map information 121, the container metadata information 122, and the data log information 123.

Then, the disk access control unit 102 acquires the data restoration information 150 corresponding to the compressed data stored for each chunk from the data restoration information generation unit 107. The disk access control unit 102 adds the data restoration information 150 to the compressed data for each chunk, and writes the data to the determined storage position of the area for storing the data log information 123. For example, the data restoration information 150 is written in the first one block in the chunk. For example, when one block is 512 KB and one chunk is 21 MB at minimum, the data restoration information 150 occupies 0.002% of the entire chunk, and thus the influence on the capacity of the disk 12 and the processing speed of the system may be ignored.

After writing the data by adding the data restoration information 150, the disk access control unit 102 registers information of the newly written data in the block map information 121, and updates the block map information 121. The disk access control unit 102 notifies the memory management unit 103 of the LBA in which the data to be written is written, the container number, the slot number, the data log position, and the value of CRC. The disk access control unit 102 requests the memory management unit 103 to update the space information 142.

When the management information is not normally acquired at the time of start-up, the disk access control unit 102 receives an input of an instruction to shift to the recovery mode from the start-up control unit 101. The disk access control unit 102 sets so that all the disk accesses other than data restoration are suppressed.

Thereafter, the disk access control unit 102 receives an instruction to read data from the start-up control unit 101. The disk access control unit 102 reads data in order from the top of the disk 12, and outputs the read data and the head address at which the data is read to the management information recovery unit 105.

When an abnormality occurs in the reading of the management information at the time of start-up, the disk access control unit 102 receives a notification of completion of the consistency check from the consistency confirmation unit 106 after the restoration of the management information and the completion of the data consistency check. The disk access control unit 102 executes a garbage collection. The garbage collection is processing of deleting data of which the number of references is 0 to perform release of the area, because the data of which the number of references is 0 in the reference list 202 is data which exists over the disk 12 but in an unused state.

For example, upon receiving the notification of completion of the consistency check, the disk access control unit 102 acquires the container metadata information 122 stored in the disk 12. The disk access control unit 102 specifies data of which the value of the counter representing the number of references is 0, and deletes the specified data from the disk 12.

The disk access control unit 102 updates the space information 142 after the completion of the garbage collection. Next, the disk access control unit 102 releases the recovery mode, and sets so that disk access other than data restoration is able to be processed. The disk access control unit 102 notifies the start-up control unit 101 of the release of the recovery mode. The disk access control unit 102 corresponds to an example of a "data processing unit". The writing and reading of data, the garbage collection, and the like correspond to examples of "processing data".

At the time of data writing, the data restoration information generation unit 107 receives, from the disk access control unit 102, an instruction to generate the data restoration information 150 illustrated in FIG. 9 for the compressed data to be stored for each chunk. The data restoration information generation unit 107 acquires the volume number in which the chunk is stored, the LBA of the volume, the next chunk number, and the data type from the information of the continuous chunk and the information of the compressed data to be stored. The data restoration information generation unit 107 generates the data restoration information 150 illustrated in FIG. 9 by using the acquired information. After that, the data restoration information generation unit 107 outputs the generated data restoration information 150 to the disk access control unit 102. The data restoration information generation unit 107 corresponds to an example of a "generation unit".

The de-duplication/compression control unit 104 receives a de-duplication determination request from the disk access control unit 102 together with data to be written. In response to the request, the de-duplication/compression control unit 104 determines whether or not the data to be written already exists in the disk 12.

When the same data exists, the de-duplication/compression control unit 104 acquires a container number and a slot number of the existing data. When the same data exists, the de-duplication is possible, and thus the de-duplication/compression control unit 104 requests the memory management unit 103 to increment the counter of the reference list 202 corresponding to the container number and the slot number where the same data as the data to be written already exists. The de-duplication/compression control unit 104 requests the memory management unit 103 to associate the container number and the slot number of the existing data with the LBA of the data to be newly written to register in the block map information 121. The de-duplication/compression control unit 104 requests the memory management unit 103 to decrement the counter of the reference list 202 corresponding to the container number and the slot number of the data to be updated. Thereafter, the de-duplication/compression control unit 104 notifies the disk access control unit 102 of the completion of writing by the de-duplication.

When the same data as the data to be written does not exist, the de-duplication/compression control unit 104 executes compression of the data to be written and generates compressed data. The de-duplication/compression control unit 104 outputs the compressed data to the disk access control unit 102 together with a notification of a result of non-duplication.

In data writing, when the same data as the data to be written already exists, the memory management unit 103 receives, from the de-duplication/compression control unit 104, an instruction to increment the counter of the reference list 202 corresponding to the container number and the slot number where the existing data exists. The memory management unit 103 increments the counter of the reference list 202 corresponding to the container number and the slot number where the existing data exists. The memory management unit 103 receives an instruction to register the block map information 121 from the de-duplication/compression control unit 104. The memory management unit 103 associates the container number and the slot number of the existing data with the LBA of the data to be newly written to register in the block map information 121. The memory management unit 103 receives, from the de-duplication/compression control unit 104, an instruction to decrement the counter of the reference list 202 corresponding to the container number and the slot number where the data to be updated exists. The memory management unit 103 decrements the counter of the reference list 202 corresponding to the container number and the slot number where the data to be updated exists.

When the same data as the data to be written does not exist, the memory management unit 103 receives, from the disk access control unit 102, a notification of the LBA in which the data to be written is written, the container number, the slot number, the data log position, and the value of CRC. The memory management unit 103 receives a request for updating the space information 142 from the disk access control unit 102. The memory management unit 103 adds information of the newly written data to the space information 142 stored in the DRAM 14, and sets the counter of the reference list 202 to 1.

At the time of start-up, the memory management unit 103 receives an instruction to acquire management information from the start-up control unit 101. The memory management unit 103 reads the volume information 141 and the space information 142 from the BUD 15 and loads them over the DRAM 14. When the volume information 141 and the space information 142 are able to be loaded to the DRAM 14, the memory management unit 103 outputs a notification of normal reading of the management information to the start-up control unit 101. On the other hand, when an abnormality occurs in the loading of the volume information 141 and the space information 142 to the DRAM 14, the memory management unit 103 outputs a notification of an abnormality occurrence in the reading of the management information to the start-up control unit 101.

When the management information is not able to be normally read at the time of start-up, the management information recovery unit 105 receives an input of data read from the disk 12 from the disk access control unit 102. At this time, the management information recovery unit 105 also acquires, from the disk access control unit 102, the head address of the area from which the data is read. The management information recovery unit 105 acquires the data restoration information 150 included in the top data of the chunk in the acquired data, and determines the data type stored in the chunk.

When the data type is the block map information 121, the management information recovery unit 105 regenerates the volume information 141 from the volume number and the volume LBA stored in the data restoration information 150 over the DRAM 14. The management information recovery unit 105 regenerates the space information 142 from the information of the data restoration information 150 indicating the next chunk over the DRAM 14.

Figure 10:
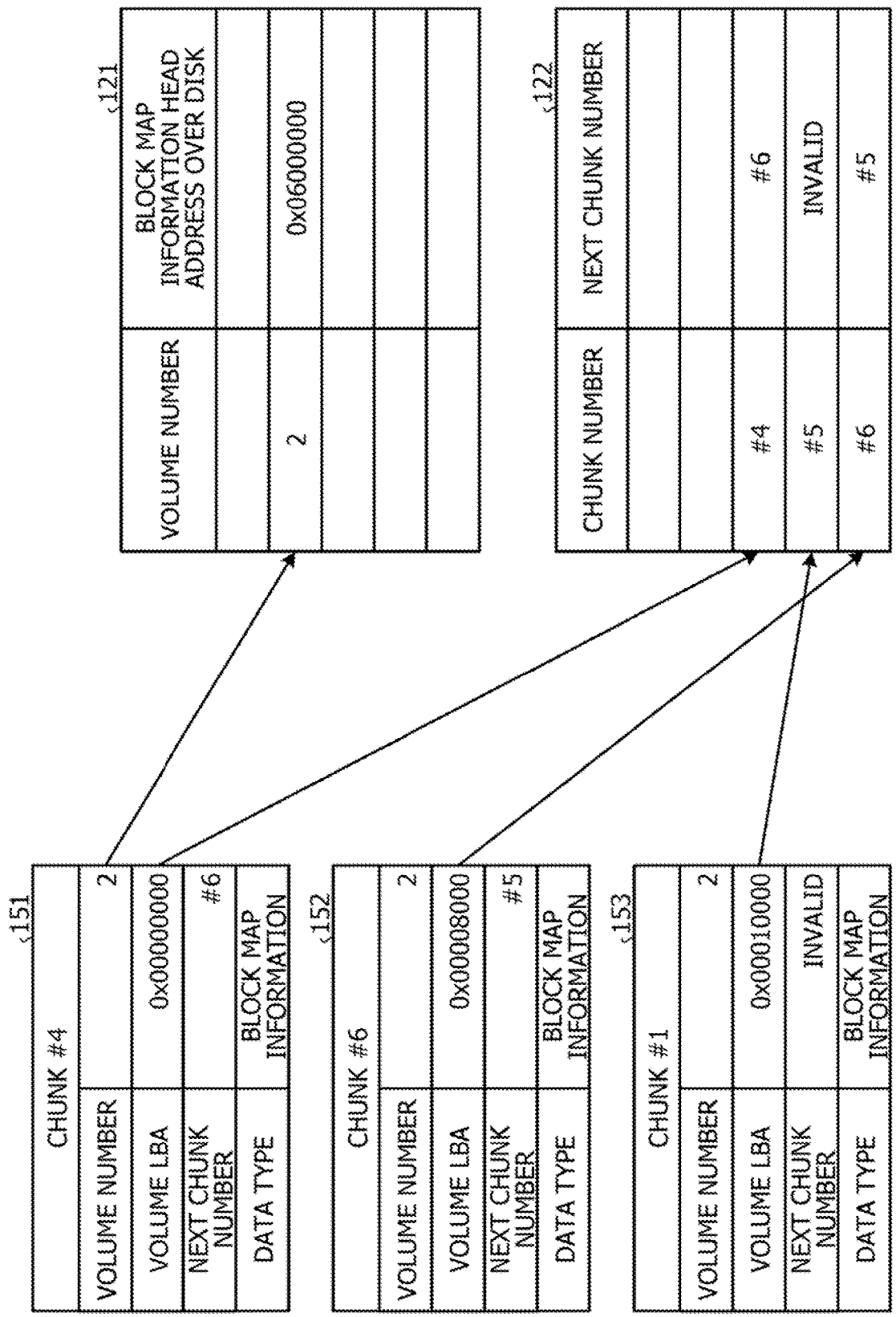
FIG. 10 is a diagram for explaining processing of regenerating management information using data restoration information of block map information.

FIG. 10 is a diagram for explaining processing of regenerating management information using data restoration information of block map information. A case where the management information recovery unit 105 acquires data restoration information 151 to 153 as the data restoration information 150 will be described.

Upon acquiring the data restoration information 151, the management information recovery unit 105 acquires "2" as the volume number from the data restoration information 151. The management information recovery unit 105 registers the volume number "2" and the block map information head address over the disk 12 corresponding thereto in the volume information 141 over the DRAM 14. In this case, the management information recovery unit 105 registers the head address of the area from which the data is read as the block map information head address over the disk 12. The management information recovery unit 105 acquires "#4" as the chunk number and acquires "#6" as the next chunk number from the data restoration information 151. The management information recovery unit 105 registers "#4" which is the chunk number and "#6" which is the next chunk number in the space information 142 over the DRAM 14 in association with each other.

Next, the management information recovery unit 105 acquires the data restoration information 152. The management information recovery unit 105 acquires "2" as the volume number from the data restoration information 152. In this case, since the volume number indicates the same volume number as that from the data restoration information 151, the management information recovery unit 105 does not register the volume number in the volume information 141. Next, the management information recovery unit 105 acquires "#6" as the chunk number and acquires "#5" as the next chunk number from the data restoration information 152. The management information recovery unit 105 registers "#6" which is the chunk number and "#5" which is the next chunk number in the space information 142 over the DRAM 14 in association with each other.

Next, the management information recovery unit 105 acquires the data restoration information 153. The management information recovery unit 105 acquires "2" as the volume number from the data restoration information 153. In this case, since the volume number indicates the same volume number as that from the data restoration information 151, the management information recovery unit 105 does not register the volume number in the volume information 141. Next, the management information recovery unit 105 acquires "#5" as the chunk number and acquires "INVALID", which is information representing the last chunk, as the next chunk number from the data restoration information 153. The management information recovery unit 105 registers "#5", which is the chunk number, and "INVALID", which represents that the chunk is the last chunk, in the space information 142 over the DRAM 14 in association with each other.

When the data type is the container metadata information 122, the management information recovery unit 105 acquires, for example, the data restoration information 154 illustrated in FIG. 11 as the data restoration information 150. FIG. 11 is a diagram illustrating an example of data restoration information of container metadata information. As illustrated in FIG. 11, when the data type is the container metadata information 122, the volume number and the volume LBA are not registered in the data restoration information 154. Since the next chunk number does not exist, INVALID is registered. When such data restoration information 154 is acquired, the management information recovery unit 105 initializes all the counters of the reference list 202 to 0. In this way, since the existing reference list 202 may be in a state before the information over the DRAM 14 is reflected, the management information recovery unit 105 resets the DRAM 14 once.

When the data type is data log information 123, the management information recovery unit 105 regenerates the space information 142 from the information stored in the data restoration information 150 indicating the next chunk over the DRAM 14.

Figure 12:
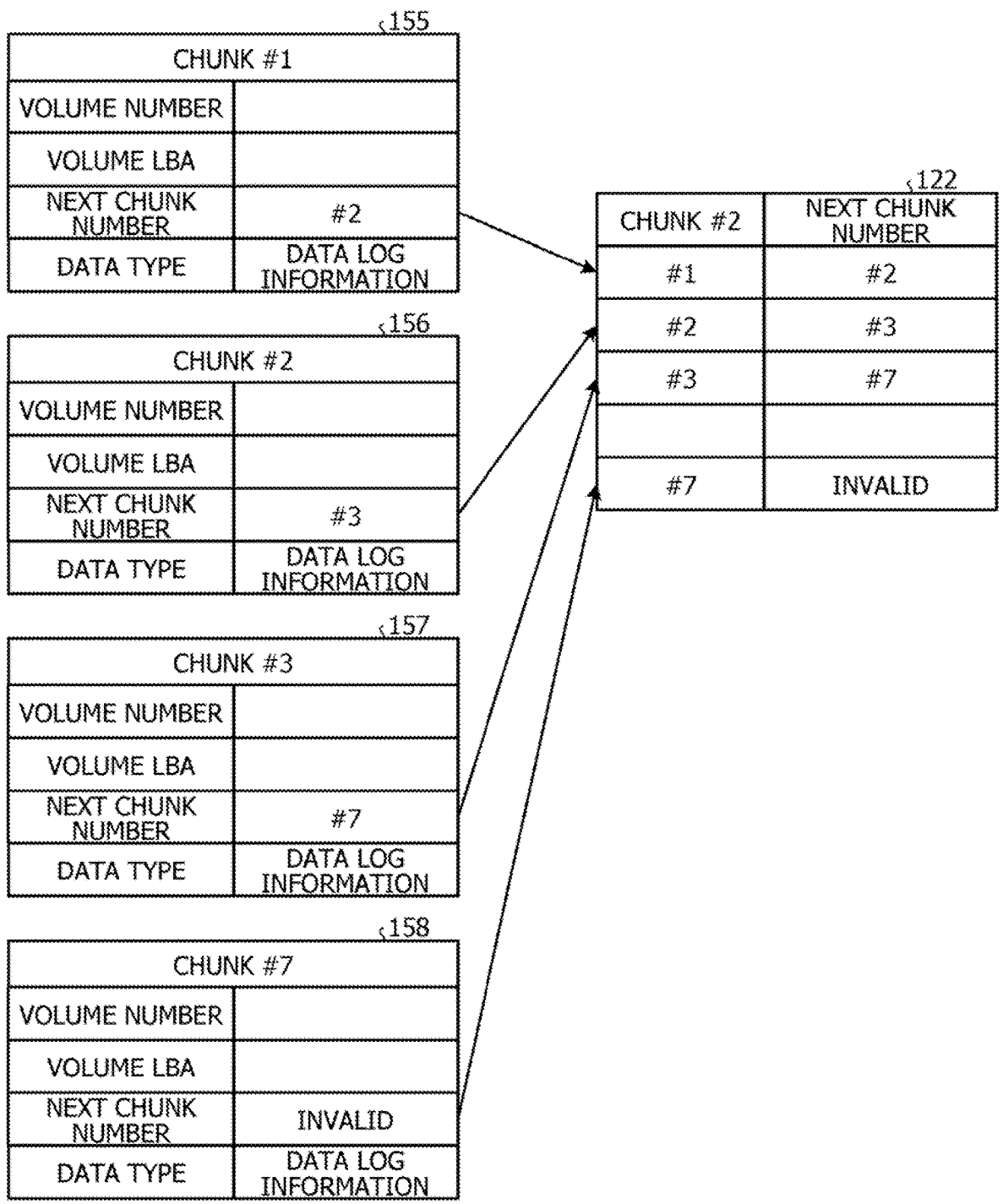
FIG. 12 is a diagram for explaining processing of regenerating management information using data restoration information of data log information.

FIG. 12 is a diagram for explaining processing of regenerating management information using data restoration information of data log information. A case where the management information recovery unit 105 acquires data restoration information 155 to 158 as the data restoration information 150 will be described.

Upon acquiring the data restoration information 155, the management information recovery unit 105 acquires "#1" as the chunk number and acquires "#2" as the next chunk number from the data restoration information 155. The management information recovery unit 105 registers "#1" which is the chunk number and "#2" which is the next chunk number in the space information 142 over the DRAM 14 in association with each other.

Next, the management information recovery unit 105 acquires the data restoration information 156. The management information recovery unit 105 acquires "#2" as the chunk number and acquires "#3" as the next chunk number from the data restoration information 156. The management information recovery unit 105 registers "#2" which is the chunk number and "#3" which is the next chunk number in the space information 142 over the DRAM 14 in association with each other.

Next, the management information recovery unit 105 acquires the data restoration information 157. The management information recovery unit 105 acquires "#3" as the chunk number and acquires "#7" as the next chunk number from the data restoration information 157. The management information recovery unit 105 registers "#3" which is the chunk number and "#7" which is the next chunk number in the space information 142 over the DRAM 14 in association with each other.

Next, the management information recovery unit 105 acquires the data restoration information 158. The management information restoration unit 105 acquires "#7" as the chunk number and "INVALID", which is information representing the last chunk, as the next chunk number from the data restoration information 158. The management information recovery unit 105 registers "#7", which is the chunk number, and "INVALID", which represents that the chunk is the last chunk, in the space information 142 over the DRAM 14 in association with each other.

When the recovery of the volume information 141 and the space information 142 is completed by using the data restoration information 150 of all the chunks, the management information recovery unit 105 notifies the consistency confirmation unit 106 of the recovery completion of the management information. The management information recovery unit 105 corresponds to an example of a "reconstruction unit".

The consistency confirmation unit 106 receives a notification of the recovery completion of the management information from the management information recovery unit 105. The consistency confirmation unit 106 reads data from the disk 12 in an ascending order of the volume number by using the restored volume information 141. At this time, the consistency confirmation unit 106 acquires the value of CRC by referring to the block map information 121 stored in the disk 12, and determines whether or not the data is correct. When the data is correctly read, the consistency confirmation unit 106 increments the counter of the reference list 202 of the container metadata information 122 corresponding to the slot number where the read data is stored by one. On the other hand, when there is an abnormality in the data, the consistency confirmation unit 106 deletes the information of the target data in the block map information 121 and sets the area indicated by the volume LBA to an unallocated state. In this case, the consistency confirmation unit 106 keeps the reference list 202 of the container metadata information 122 as it is.

When the consistency check of all the data stored in all the volumes is completed, the consistency confirmation unit 106 notifies the disk access control unit 102 of the completion of the consistency check.

Figure 13:
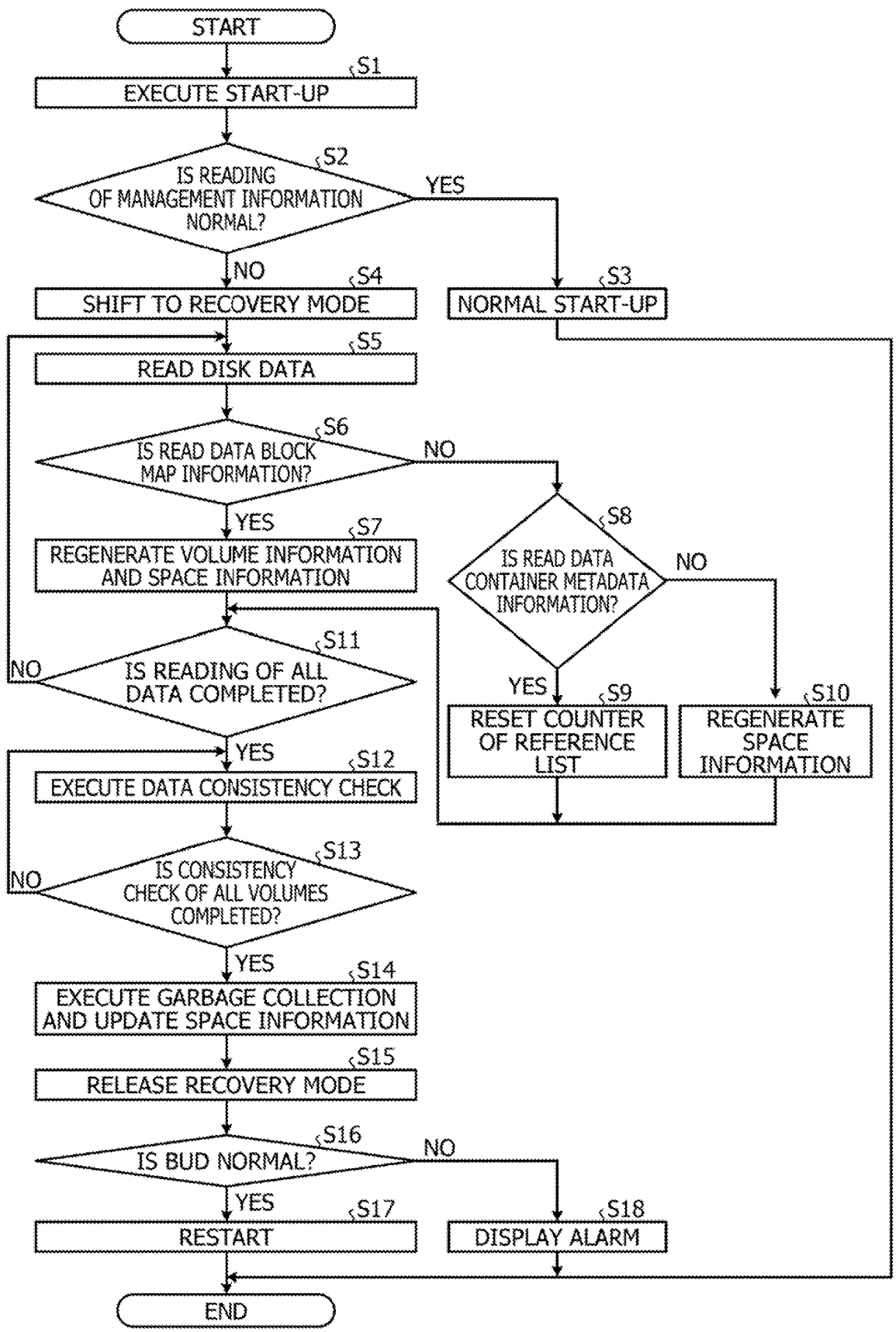
FIG. 13 is a flowchart of start-up processing of a storage apparatus according to an embodiment.

Next, a flow of an operation of the storage apparatus 10 according to the present embodiment at the time of start-up will be described with reference to FIG. 13. FIG. 13 is a flowchart of start-up processing of a storage apparatus according to the embodiment.

The start-up control unit 101 executes start-up of the storage apparatus 10 by turning on the power or the like (step S1).

The start-up control unit 101 instructs the memory management unit 103 to read the management information including the volume information 141 and the space information 142. The memory management unit 103 reads the management information including the volume information 141 and the space information 142 stored in the BUD 15 and stores the management information over the DRAM 14. The memory management unit 103 notifies the start-up control unit 101 of the result of the reading of the management information. The start-up control unit 101 receives the notification of the result of the reading from the memory management unit 103 and determines whether or not the reading of the management information is normally performed (step S2).

When the reading of the management information is normally performed (step S2: Yes), the start-up control unit 101 performs normal start-up and completes the start-up processing (step S3).

On the other hand, when an abnormality occurs in the reading of the management information (step S2: No), the start-up control unit 101 instructs the disk access control unit 102 to shift to the recovery mode. Upon receiving the instruction from the start-up control unit 101, the disk access control unit 102 shifts to the recovery mode (step S4) and limits access to the disk 12 to data restoration.

The start-up control unit 101 instructs the management information recovery unit 105 to execute recovery processing of the management information. Upon receiving the instruction from the start-up control unit 101, the management information recovery unit 105 reads data stored in the disk 12 for each chunk (step S5).

The management information recovery unit 105 acquires the data restoration information 150. The management information recovery unit 105 acquires the data type from the data restoration information 150 and determines whether or not the read data is the block map information 121 (step S6). When the read data is the block map information 121 (step S6: Yes), the management information recovery unit 105 regenerates the volume information 141 and the space information 142 over the DRAM 14 by using the data restoration information 150 (step S7).

On the other hand, when the read data is not the block map information 121 (step S: No), the management information recovery unit 105 determines whether or not the read data is the container metadata information 122 (step S8). When the read data is the container metadata information 122 (step S8: Yes), the management information recovery unit 105 resets the counter of the reference list 202 included in the container metadata information 122 corresponding to the read data (step S9).

On the other hand, when the read data is not the container metadata information 122 (step S8: No), the management information recovery unit 105 determines that the read data is the data log information 123. The management information recovery unit 105 regenerates the space information 142 over the DRAM 14 by using the data restoration information 150 (step S10).

Next, the management information recovery unit 105 determines whether or not reading of all the data is completed (step S11). When there remains unread data (step S11: No), the management information recovery unit 105 returns to step S5.

On the other hand, when the reading of all the data is completed (step S11: Yes), the management information recovery unit 105 notifies the consistency confirmation unit 106 of the recovery completion of the management information. Upon receiving the notification of the recovery completion of the management information, the consistency confirmation unit 106 executes the data consistency check (step S12).

Thereafter, the consistency confirmation unit 106 determines whether or not the consistency check is completed for all the volumes (step S13). When there remains a volume for which the consistency check is not performed (step S13: No), the consistency confirmation unit 106 returns to step S12 and repeats the consistency check.

On the other hand, when the consistency check is completed for all the volumes (step S13: Yes), the consistency confirmation unit 106 notifies the disk access control unit 102 of the completion of the consistency check. Upon receiving the notification of completion of the consistency check, the disk access control unit 102 executes a garbage collection. Then, the disk access control unit 102 updates the space information 142 according to the result of the garbage collection (step S14).

Thereafter, the disk access control unit 102 releases the recovery mode (step S15). The disk access control unit 102 notifies the start-up control unit 101 of the release of the recovery mode.

The start-up control unit 101 receives the notification of the release of the recovery mode from the disk access control unit 102, and requests the memory management unit 103 to confirm whether or not the BUD 15 is normal. The memory management unit 103 checks the operation of the BUD 15 and returns the determination result of the operation to the start-up control unit 101. The start-up control unit 101 determines whether or not the BUD 15 is normal by using the determination result of the operation of the BUD 15 acquired from the memory management unit 103 (step S16).

When the BUD 15 is normal (step S16: Yes), the start-up control unit 101 restarts the storage apparatus 10 (step S17).

On the other hand, when an abnormality occurs in the BUD 15 (step S16: No), the start-up control unit 101 causes the display device to display an alarm (step S18).

Figure 14:
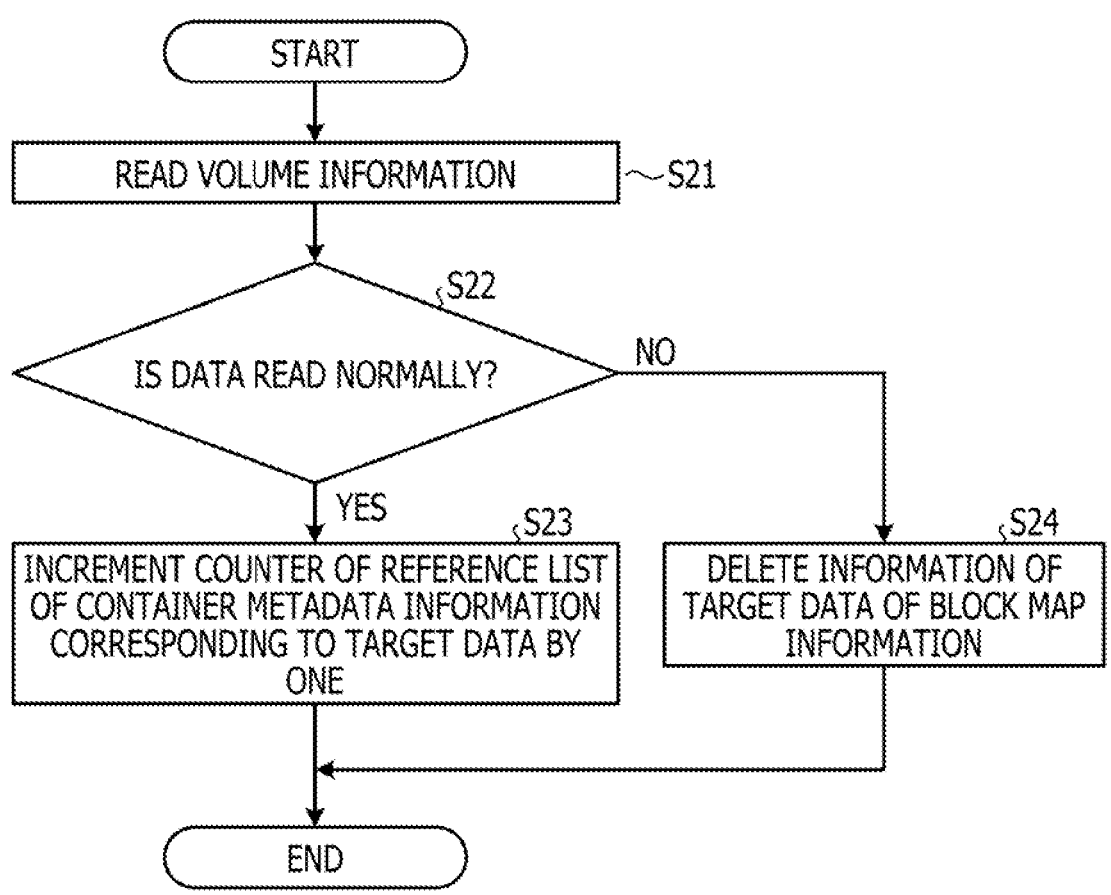
FIG. 14 is a flowchart of data consistency check processing.

Next, the flow of data consistency check processing will be described with reference to FIG. 14. FIG. 14 is a flowchart of data consistency check processing.

The consistency confirmation unit 106 reads the volume information 141 from the DRAM 14 (step S21).

Next, the consistency confirmation unit 106 requests the disk access control unit 102 to read data, and acquires data read from the disk 12 by the disk access control unit 102. The read data to be subjected to the consistency check is referred to as "target data" here. The consistency confirmation unit 106 compares the value of CRC of the target data with the value of CRC registered in the volume information 141 to determine whether or not the data is normally read (step S22).

When the data is normally read (step S22: Yes), the consistency confirmation unit 106 increments the counter of the reference list 202 of the container metadata information 122 corresponding to the target data by one (step S23). As a result, the target data is set to be in use, and the referenced number of the target data is registered.

On the other hand, when the reading of the data is not normally performed (step S22: No), the consistency confirmation unit 106 deletes the information of the target data in the block map information 121 (Step S24). Accordingly, the area where the target data is stored is set to be in an unallocated state. In this case, the consistency confirmation unit 106 does not operate the counter of the reference list 202 of the container metadata information 122 corresponding to the target data. For example, the number of references to the target data is not increased, and when the target data is in an unused state, the unused state is maintained as it is.

As described above, the storage apparatus according to the present embodiment stores data restoration information for each chunk when storing data. When the management information is not able to be read at the time of start-up, the storage apparatus restores the management information by using the data restoration information. Thus, even when the management information is lost due to a power failure caused by a lightning strike or the like, it is possible to restore the state in which the data over the disk is able to be accessed again, and the reliability of the storage apparatus may be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus, comprising:
a memory; and
a processor coupled to the memory and configured to:
receive management information for managing data stored in a first storage device,
generate, for each processing unit of the data, restoration information for restoring the management information,
add the data to the restoration information by processing the data based on the management information on a second storage device, store, in the first storage device, the added restoration information, determine whether a first piece of the data stored in the second storage device is block map information based on the added restoration information when detecting an abnormality occurrence on the receiving the management information, reconstruct the management information on the second storage device when the first piece of the data is the block map information based on the added restoration information, determine whether an abnormality occurrence on the receiving a second piece of the data based on the block map information, and when the abnormality occurrence on the receiving the second piece of the data, delete information regarding the second piece of the data from the block map information.

2. The storage apparatus according to claim 1, wherein the restoration information includes information representing a data type for each processing unit.

3. The storage apparatus according to claim 1, wherein the restoration information includes information representing a data connection for each processing unit.

4. The storage apparatus according to claim 1, wherein the restoration information includes information of a storage position of data in the storage device for each processing unit.

5. A storage control method executed by a computer, the storage control method comprising:

receiving management information for managing data stored in a first storage device;

generating, for each processing unit of the data, restoration information for restoring the management information;

adding the data to the restoration information by processing the data based on the management information on a second storage device;

storing, in the first storage device, the added restoration information, determine whether a first piece of the data stored in the second storage device is block map information based on the added restoration information when detecting an abnormality occurrence on the receiving the management information;

reconstructing the management information on the second storage device when the first piece of the data is the block map information based on the added restoration information;

determining whether an abnormality occurrence on the receiving a second piece of the data based on the block map information; and when the abnormality occurrence on the receiving the second piece of the data, deleting information regarding the second piece of the data from the block map information.

6. The storage control method according to claim 5, wherein the restoration information includes information representing a data type for each processing unit.

7. The storage control method according to claim 5, wherein the restoration information includes information representing a data connection for each processing unit.

8. The storage control method according to claim 5, wherein the restoration information includes information of a storage position of data in the storage device for each processing unit.

* * * * *